Nov. 5, 1929.  E. G. STONE  1,734,504
COTTON HARVESTER
Filed Feb. 28, 1927  2 Sheets-Sheet 1
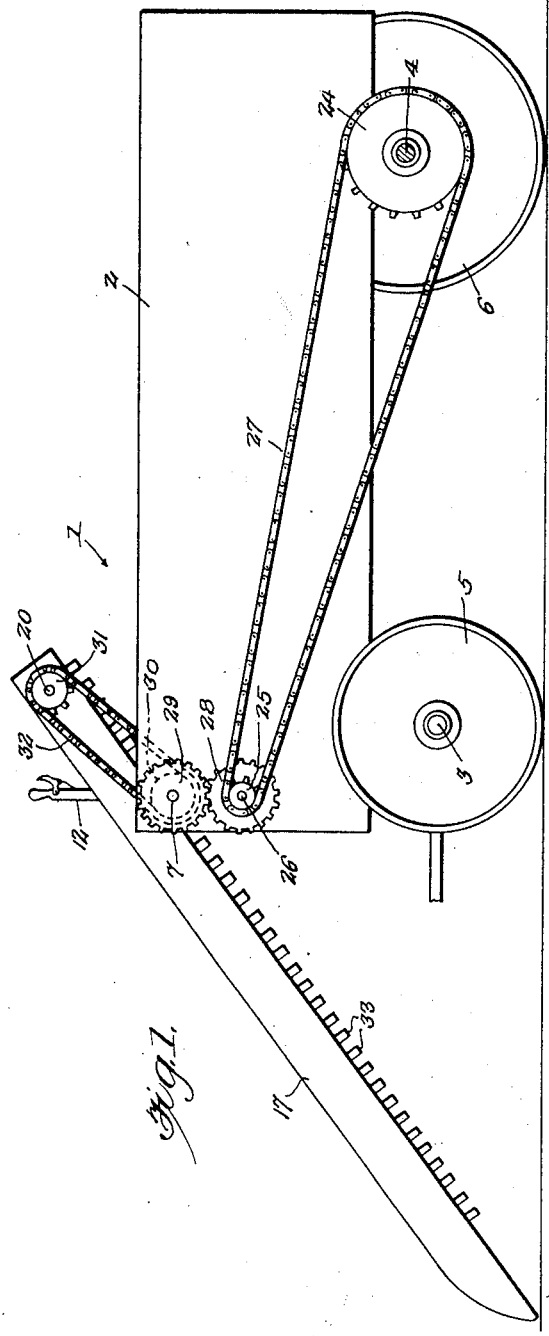
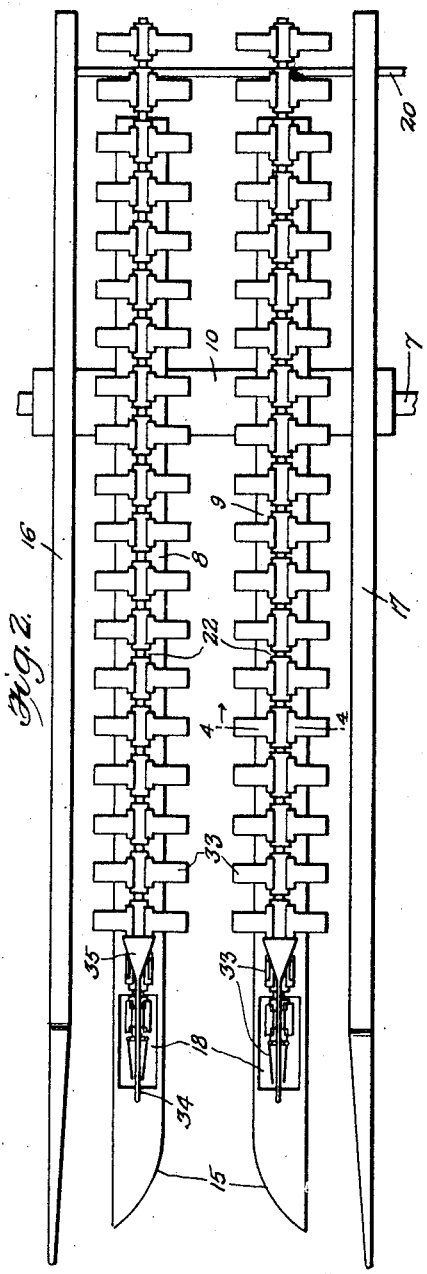
Inventor
E. G. Stone,
By Clarence A. O'Brien
Attorney

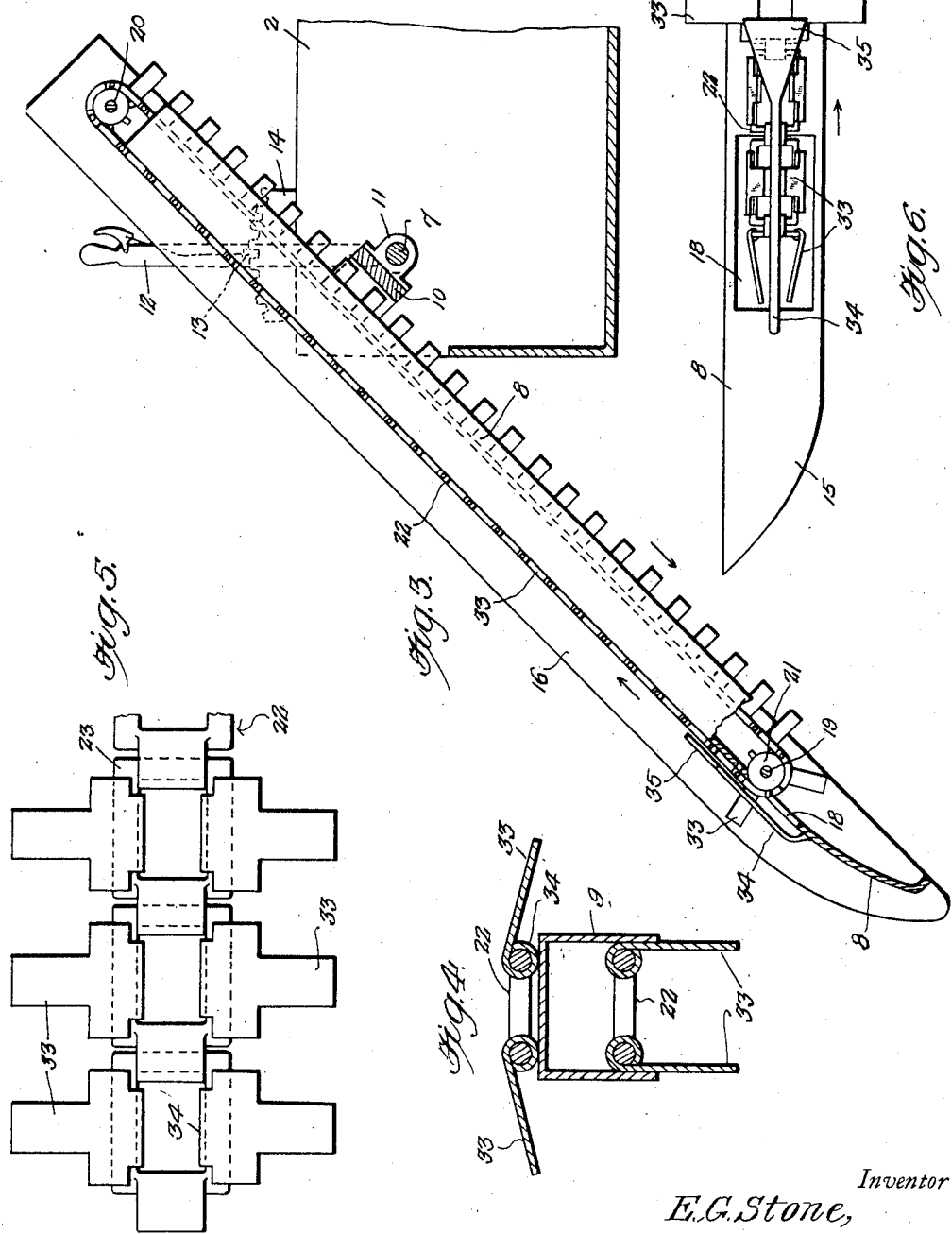

Patented Nov. 5, 1929

1,734,504

UNITED STATES PATENT OFFICE

ENOCH G. STONE, OF PIEDMONT, OKLAHOMA

COTTON HARVESTER

Application filed February 28, 1927. Serial No. 171,544.

The present invention relates to improvements in cotton harvesters and has for its principal object to provide a machine wherein co-acting endless chains which are adapted to travel at the same rate of speed as the machine are provided with fingers which gather the cotton bolls and deliver the same into a gathering box.

Another important object of the invention is to provide a cotton harvester which has fingers arranged in pairs that are hingedly secured to the opposite sides of each link of the endless chain, the fingers on each link being disposed in a vertical position while travelling downwardly beneath the arm over which the endless chain is trained, means being arranged at the lower end of the arms for spreading the fingers of each link outwardly to a substantially horizontal position so that the same will gather the cotton bolls while travelling upwardly on the arm.

A still further object of the invention is to provide a cotton harvester of the above-mentioned character which will at all times be positive and efficient in its operation, means being provided whereby the endless chain supporting arms which are disposed at an incline may be adjusted to any angular position.

Another important object is to provide a cotton harvester of the above-mentioned character which is simple in construction, inexpensive, and further well adapted for the purposes for which the same is designed.

Other objects and advantages of this invention will become apparent during the course of the following description.

In the accompanying drawings forming part of this specification and in which like numerals are employed to designate like parts throughout the same:

Figure 1 is a side elevation of a cotton harvester embodying the features of my invention, Figure 2 is an enlarged top plan view of a forward portion of the machine showing the spaced arms with the endless chains trained thereover and the cotton boll gathering fingers spread outwardly, and also showing the side boards, Figure 3 is a view partly in section and partly in elevation showing the manner in which the arms are mounted on a box and also disclosing in side elevation the finger spreading means at the lower end of the arms, Figure 4 is a sectional view taken approximately on line 4—4 of Figure 2 looking in the direction of the arrow and showing the channel-shaped arm and the position of the fingers both above and beneath the arm, Figure 5 is a fragmentary top plan view of the endless chain and the cotton boll gathering fingers associated therewith, and Figure 6 is a detail top plan showing the finger spreading means.

In the drawings, wherein, for the purpose of illustration, is shown the preferred embodiment of my invention, the numeral 1 designates generally my improved cotton harvesting machine, the same comprising a wagon box body 2 which is supported on the front and rear axles 3 and 4 respectively in a suitable manner. The front wheels are indicated at 5 and the rear wheels are designated by the numerals 6. Any suitable means may be provided for drawing the wagon box body over the cotton rows and as the same forms no important part of the present invention, a detailed description thereof is thought unnecessary.

A rocker shaft 7 extends transversely across the upper forward end portion of the box 2 and the purpose thereof will be hereinafter more fully described. As is further shown in Figure 3, the upper forward end of the box is cut away and disposed within the cut-away portion is the intermediate portion of a pair of spaced elongated arms 8 and 9 respectively. Each arm is channel-shaped in cross section as is clearly illustrated in Figure 4. The arms are secured in spaced relation on cross bar 10 and this cross bar is provided with suitable journals such as shown at 11 for receiving the shaft 7 and thereby providing means for permitting the arms to be raised or lowered. The arms are disposed at an incline and the lower ends thereof extend in close proximity to the ground.

The means for effecting the raising and lowering of the inclined arms comprises a lever 12 secured at its lower end on one end of the shaft 7. A manually controlled pawl 13 is associated with this lever and this pawl cooperates with a segmental rack 14 which is secured on the side of the wagon box 2.

The lower end of each arm is closed and curved as indicated at 15 to provide a guide whereby the cotton stalks will be properly guided between the spaced arms 8 and 9 as the machine travels over the cotton rows when in operation.

Arranged adjacent the outer sides of the arms 8 and 9 are a pair of vertically disposed side boards 16 and 17 respectively and these boards are also secured on the cross bar 10 and are slightly longer than the arms as is clearly shown in Figure 3. These side boards are provided for the purpose of preventing the cotton bolls which are gathered from falling off from the gathering means while being conveyed upwardly to the receiving box 2.

An elongated and relatively wide slot 18 is formed in the upper face of each channeled bar adjacent the curved lower end thereof and this feature is more clearly illustrated in Figures 2 and 6. The purpose of this slot will also be presently apparent.

A shaft 19 extends transversely between the sides of each arm adjacent the rear end of the slot 18. A similar shaft 20 extends transversely between the sides of the upper ends of the side boards 16 and 17 respectively. A pair of sprocket wheels 21—21 are mounted in alinement on each of the lower shafts 19 and the upper shafts 20 respectively. A sprocket chain 22 is trained over each pair of alined sprocket wheels. The links which comprise the sprocket chain 22 are shown at 23 and are substantially rectangular in design as is more clearly illustrated in Figure 5.

Each chain is adapted to travel over the upper face of each arm as well as between the depending sides thereof and the slot 18 will permit the chains to pass through the upper face of each arm.

The chains are driven by means of a connection with the rear axle 4 and this connection includes the provision of a sprocket wheel 24 carried by the rear axle 4 and arranged in alinement with this sprocket wheel is a smaller sprocket wheel 25 supported on a suitable shaft 26 which is arranged transversely through the sides of the box 2 at the forward end thereof. A driving sprocket chain 27 is trained over the alining sprocket wheels 24 and 25. Intermeshing gears 28 and 29 are secured or mounted on the forward upward portion of the box and associated with the last-mentioned gear 29 is a sprocket wheel 30 which is adapted for cooperation with sprocket wheel 31 secured on the outer end of the shaft 20 and a sprocket chain 32 is trained over these last-mentioned sprocket wheels.

It is of course to be understood that the chains 22 are to be driven at substantially the same rate of speed as the machine travels forwardly over the cotton rows.

The cotton boll gathering means comprises pairs of co-acting fingers designated by the numeral 33 and each finger is formed of sheet metal, the inner end thereof being enlarged and so bent around the respective sides of the rectangular-shaped link 23 of the chain 22 as to provide a hinge connection 34' between the inner end of the fingers and the respective sides of the links. In this manner, the fingers will be adapted for swinging movement and when the fingers ride over the upper open ends of the respective arms, the same will automatically swing downwardly to a vertical position and will remain in this position while travelling downwardly beneath the respective arms and the downwardly disposed fingers will be confined within the sides of the channeled arms in the manner as clearly illustrated in Figure 4. For the purpose of spreading the fingers 33 outwardly so as to be disposed in an operative position as the same passes onto the upper face of each arm, there is provided a suitable spreading means on the upper face of each arm directly rearwardly of the slot 18 and this particular spreading means comprises a rod-like member 34 which is secured at its forward end to the upper face of each arm at a point forwardly of the slot 18 and this rod extends longitudinally across the slot in spaced relation thereto and at the intermediate portion thereof. The rear end of this rod terminates in a flat V-shaped head 35, the apex of which is disposed adjacent the rear end of the slot and the structure embodying this spreading means is clearly illustrated in Figure 6.

Manifestly, as the chain passes through each slot 18, the fingers 33 will engage the opposite sides of the V-shaped head 35 and will thus be caused to spread out and after the fingers have passed beyond the V-shaped head, the same will be disposed substantially horizontally and outwardly of the respective sides of each arm in the manner as clearly shown in Figures 2, 4 and 6 thus placing the fingers in an operative position and the inner opposed fingers will engage the cotton stalks and maintain the same in an upward position and simultaneously will gather the bolls and convey the same upwardly into the box 2.

The cotton plants of the row enter between the respective arms of the harvester at the forward or bottom point. The fingers 33 opening out beneath the lower branches of the plant and enclosing the same will move upwardly to the top of the cotton plant, thus stripping or combing off the bolls upwardly, and conveying the same rearwardly into the box.

As soon as the fingers reach the upper end of each arm, they will by gravity drop to a vertical position and will move downwardly beneath the arms as the links which carry these fingers travel over the sprocket wheels on the shafts 19 and 20.

It will thus be seen from the foregoing description, that I have provided a cotton harvesting machine which will at all times be positive and efficient in its operation, and which will save considerable time and labor in gathering cotton bolls.

While I have shown the preferred embodiment of my invention, it is to be understood that various changes in the size, shape and arrangement of parts may be resorted to without departing from the spirit or sacrificing any of the advantages of the appended claims.

What I claim as new is:—

1. In a cotton harvester, a pair of spaced inclined arms, an endless chain adapted to travel over and beneath each arm, cotton boll gathering fingers hingedly secured to the chain, said fingers being disposed downwardly in a vertical position while moving beneath each arm, and means for swinging the fingers outwardly to a substantially horizontal position as the same reach the forward end portion of each arm prior to the chain travelling upwardly on the upper face of the respective arm.

2. In a cotton harvester, a pair of spaced inclined arms, an endless chain adapted to travel over and beneath each arm, cotton boll gathering fingers hingedly secured to the chain, said fingers being disposed downwardly in a vertical position while moving beneath each arm, and means for swinging the fingers outwardly to a substantially horizontal position as the same reach the forward end portion of each arm prior to the chain travelling upwardly on the upper face of the respective arm, said means comprising a substantially V shaped spreader, the apex thereof being disposed adjacent the forward end of each arm, said hinged fingers adapted to engage the sides of the V-shaped spreader.

3. In a cotton harvester, a pair of inclined arms, each arm being formed with an enlarged slot in the forward end portion thereof, an endless chain adapted to travel over and beneath each arm and through said slot, cotton boll gathering fingers hingedly connected at their inner edges to the respective sides of the links of each chain, said fingers being disposed downwardly in a vertical position while moving beneath the arm, and means for swinging each pair of fingers outwardly to a substantially horizontal position after the same pass through the slot in each arm whereby the fingers will be disposed in an operative position while travelling over the upper face of the arm.

4. In a cotton harvester, a pair of inclined arms, each arm being formed with an enlarged slot in the forward end portion thereof, an endless chain adapted to to travel over and beneath each arm and through said slot, cotton boll gathering fingers hingedly connected at their inner edges to the respective sides of the links of each chain, said fingers being disposed downwardly in a vertical position while moving beneath the arm, and means for swinging each pair of fingers outwardly to a substantially horizontal position after the same pass through the slot in each arm whereby the fingers will be disposed in an operative position while travelling over the upper face of the arm, said means comprising a V-shaped member arranged in spaced relation with the upper face of each arm and having its apex disposed adjacent the rear end of the slot, said hinged fingers adapted to engage the sides of the V-shaped spreader.

5. In a cotton harvester, a pair of inclined arms, each arm being formed with an enlarged slot in the forward end portion thereof, an endless chain adapted to travel over and beneath each arm and through said slot, cotton boll gathering fingers hingedly connected at their inner edges to the respective sides of the links of each chain, said fingers being disposed downwardly in a vertical position while moving beneath the arm, and means for swinging each pair of fingers outwardly to a substantially horizontal position after the same pass through the slot in each arm whereby the fingers will be disposed in an operative position while travelling over the upper face of the arm, said means comprising a V-shaped member arranged in spaced relation with the upper face of each arm and having its apex disposed adjacent the rear end of the slot, said hinged fingers adapted to engage the sides of the V-shaped spreader, and side boards disposed vertically adjacent the outer sides of the respective arms.

In testimony whereof I affix my signature.

ENOCH G. STONE.